United States Patent [19]

Gitterman, III

[11] Patent Number: 5,785,011
[45] Date of Patent: Jul. 28, 1998

[54] BREAK AWAY TETHER STRAP ASSEMBLY

[76] Inventor: Joseph L. Gitterman, III. 55 Shinar Mountain Rd., Washington Depot, Conn. 06794

[21] Appl. No.: 901,293

[22] Filed: Jul. 5, 1997

[51] Int. Cl.$^6$ .................................................. A01K 27/00
[52] U.S. Cl. .................................................. 119/865
[58] Field of Search .................................. 119/863, 864, 119/865, 769, 772, 776, 792, 795, 797

[56] References Cited

U.S. PATENT DOCUMENTS

| | | | |
|---|---|---|---|
| 4,426,957 | 1/1984 | Horrigan | 119/865 |
| 4,787,340 | 11/1988 | Kirtley | 119/792 |
| 5,031,576 | 7/1991 | Weinberg | 119/865 |
| 5,050,538 | 9/1991 | Gurski, Jr. | 119/865 |
| 5,450,820 | 9/1995 | Kirsch | 119/865 |

*Primary Examiner*—Thomas Price
*Attorney, Agent, or Firm*—Howard S. Reiter

[57] ABSTRACT

A breakaway strap assembly for tethering a domestic animal such as a horse, employs two elongate straps separably attached by mating hook-and-loop surfaces. The mating hooks and loops resist longitudinal separation of the two straps. The hooks and loops are formed of resilient plastic material that permits them to unbend elastically so as to disengage from each other. Anchor clasps at one end of each strap allow the straps to be attached, respectively, to a fixed structure, such as a building and to a movable point such as the harness worn by a horse. The axial force resisting separation of the two straps can be varied from a low value to a relatively higher value by varying the longitudinal overlap of the two straps. In the disclosed embodiment, the movable strap member carries two loop surface elements, one on each of its oppositely facing longitudinal surfaces; and the fixed strap has a bifurcated shape having two coextensive parallel strap parts coupled together at one end of each, and having a common clasp member attached to the coupled-together ends, such that the two parts present two opposed inwardly facing surfaces for capturing the movable strap between them. The loops on the outer surfaces of the movable strap engage with the hooks on the opposed inwardly facing surfaces of the fixed strap to hold the two parts of the strap assembly 10 in assembled condition. The longitudinal force required to separate the strap assembly is dependent upon the length of overlap between the hook strips and the loop strips. The separation force may be further varied by a closely confining collar buckle that surrounds the outer periphery of the assembled straps and resists disengagement of the hook and loop surfaces as the straps are pulled apart. The axial breakaway restraining force i.e. "separation force" is increased as the restraining collar is moved closer to the free ends of the fixed strap.

5 Claims, 1 Drawing Sheet

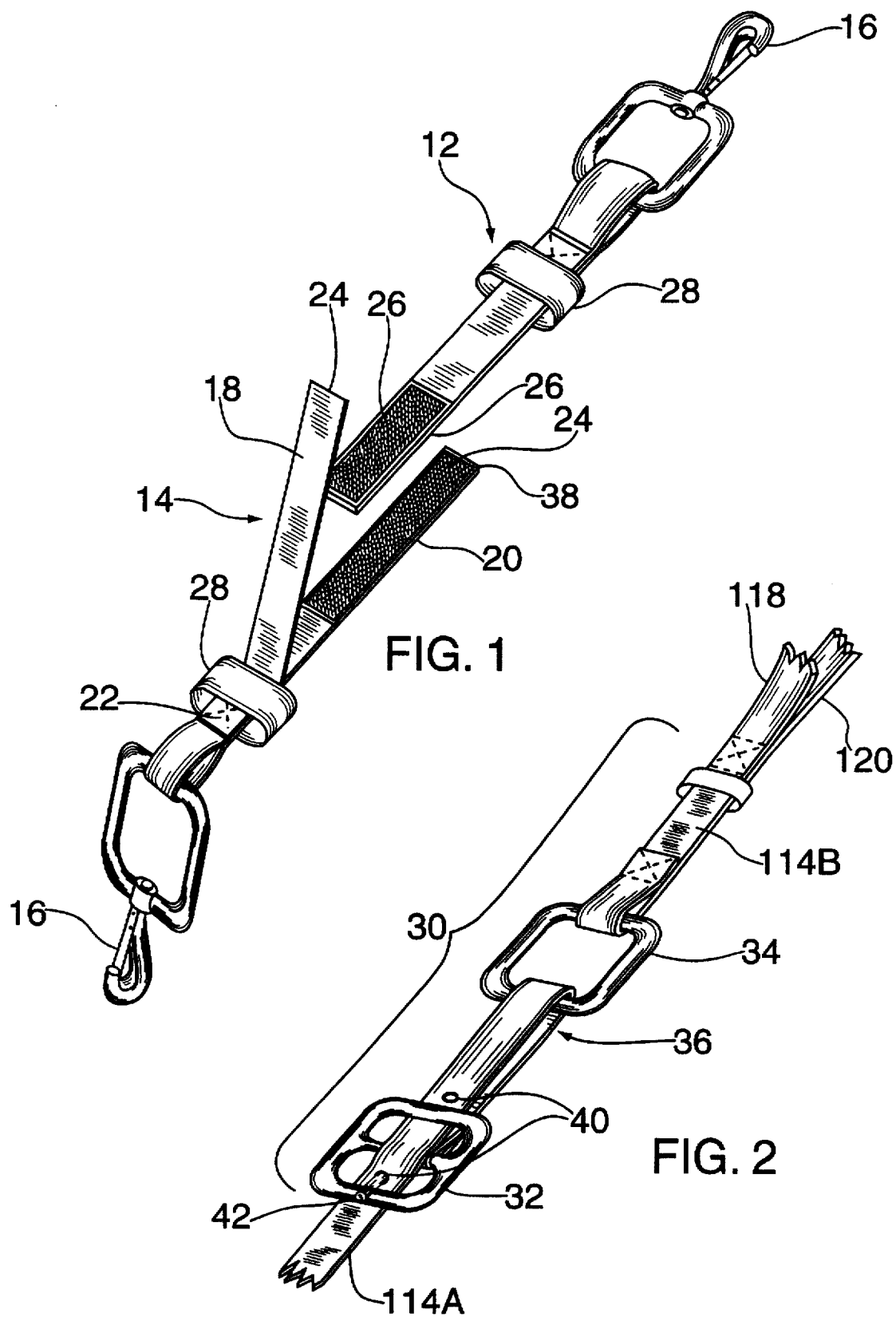

BREAK AWAY TETHER STRAP ASSEMBLY

BACKGROUND OF THE INVENTION

This invention relates generally to restraining straps of the type used, for example, to tether a horse, and relates more specifically to restraints having a separable feature that permits the strap to separate into two component elements when subjected to axial forces substantially higher than ordinary tethering forces; under ordinary circumstances, the restraining strap assembly will fully and effectively restrain an animal such as a horse in a particular area. However, if unusual circumstances prompt the animal to exert extraordinary axial force on the restraining strap assembly, the assembly will then separate into two component elements, so that the animal can then escape from the immediate area in which it is tethered. Such separable restraints can be of extreme importance in saving the life of a valuable animal, for example, in case a fire breaks out in an area where an unattended animal is tethered. Under such circumstances, an animal such as a horse will tend to "bolt" away rather than follow its more usual habit of persistently straining or pulling at its tether. Persistent straining or pulling of this type tends to result in a more or less constant force that is substantially lower than the force produced by the impact of an animal weighing a ton or more, suddenly moving from a slack restraint condition to a full tension condition at high acceleration.

A restraint that will successfully resist the forces resulting from horses persistently straining or pulling at their tethers, but will separate to allow the animal to escape when relatively high and sudden axial impact force is applied to the restraint, is very desirable from the standpoints of safe, humane and economic animal husbandry.

Accordingly it is an object of this invention to provide a restraining strap assembly that will restrain a horse or other large domestic animal to a given fixed location under normal conditions but will allow the restraint to separate so that the animal can escape from the fixed location when unusual axial force is applied to the restraint.

It is another object of this invention to provide a breakaway restraint assembly in which the breakaway force can be varied selectively between a relatively low figure and a relatively higher figure to accommodate a variety of different-sized animals.

Another object of this invention is the provision of a breakaway restraint strap assembly that is reusable and can be reassembled easily for reuse after each breakaway operation.

Yet another object of this invention is the provision of a breakaway restraint strap assembly in which the movable strap element that remains with the animal after the breakaway occurs, can be gripped securely and comfortably by an attendant to help lead the horse when it is recaptured.

These and other and further objects, features and advantages of this invention will be made obvious to those having skill in this art by reference to the following specification when considered in conjunction with the accompanying drawings, in which:

BRIEF DESCRIPTION OF THE DRAWINGS

FIG. 1 is a perspective view of a breakaway restraint strap assembly in accordance with this invention.

FIG. 2 is a perspective view of an alternate form of a portion of the strap assembly illustrated in FIG. 1.

DETAILED DESCRIPTION OF THE INVENTION

Referring now more specifically to the drawings, the illustrated embodiment of a breakaway restraint strap assembly 10 in accordance with this invention may be seen to comprise a movable strap member 12, and a fixed strap member 14. Each of the two strap members 12, 14, has a releasable anchor clasp device 16 of known design, securely attached to one end thereof, in any suitable manner.

Fixed strap member 14 may be seen to be of bifurcated configuration, comprising two substantially coextensive and parallel strap elements 18, 20, coupled together at one end 22 of each element.

Each strap member 12, 14 has one half of a mating hook-and-loop combination 24, 26 securely fastened to the surface of at least part of the length of the strap.

The hook portion 24 and the loop portion 26 may be of any known design and construction such as is commercially available under the trademark, Velcro. The respective hook and loop structures are formed of resilient plastic material so that significant longitudinal force applied to the opposite ends of the strap assembly 10, will cause the hooks to unbend elastically and release from within the loops, thereby permitting axial separation of the movable strap member 12 from the fixed strap member 14. That is, the hooks tend to straighten, or "uncurl", in a direction parallel to the longitudinal axis of the assembly 10, as they are pulled against the loops until they are straight enough to release their "grip" on the loop. At the same time, the loops are displaced in a direction parallel to the longitudinal axis of the assembly, in response to the force applied by the hooks. However, because the hook and loop surfaces are moving parallel to each other rather than away from each other in a normal direction, each hook, as it releases from a loop, recurls to its original shape as a result of plastic memory, and thus is available to hook into another loop that has been released by a preceding hook. This function is distinguished from the conventional operation of hook and loop interlocking structures, in which the customary method of separation is to "peel" one half of the structure away from the other half by applying force in a direction substantially normal to the interlocked surfaces; when force is applied in this usual manner, the hook surface is separated from the loop surface along substantially one transverse line of hooks and loops at a time, in sequence. Accordingly, only a few hooks and loops are separated at any one time, and each hook is separated from an engaged loop only once during the "usual" separation process. It will be understood readily that the applied normal direction force necessary to achieve "usual" separation of a strip of hook and loop material, having a given engaged axial length, will be significantly less than the force required to separate an equal length of such material using force applied primarily in a direction parallel to the axial length of the strip.

To vary the force required to separate the movable member 14 from fixed member 12, strap assembly 10 is provided with a restraining collar 28 encircling the assembly in a plane substantially normal to the longitudinal axis of the assembly. Collar 28 is dimensioned to closely engage the outer circumference of all three layers defined by strap members 12 and 14 when they are layered together. Constraining the layers of the assembly to remain in closely abutting relationship within the confines of collar 28 further increases the longitudinal force required to separate movable strap member 14 from fixed strap member 12, by inhibiting displacement of the hooks relative to the loops, and by increasing the frictional engagement between the various layers and surfaces of the strap members 12, 14, within the confines of collar 28. It will also be understood in this regard, that strap assembly 10 may be provided with more than one such collar 28, if desired, so as to further increase the force required for axial separation of strap members 12 and 14.

It may now be understood that the axially applied force required to separate the strap assembly 10 into its two component portions can be adjusted to be as great as desired by selecting the appropriate combination of hook and loop structures, the total surface area engaged between the cooperating hook and loop surfaces, the position of the collar or collars 28 along the strap length, and the dimensions of the confining collar or collars. In this regard, it can be seen that the total energy input required for separation of the strap portions is a function of both the applied force and the applied energy input. Energy input, in turn is a function of the mass of the tethered animal and the impulse or acceleration forces generated by such a mass moving against the tether at a rapidly increasing velocity. Such energy forces greatly exceed the force generated by the steady application of animal pulling force in the absence of impulse and acceleration considerations.

FIG. 2 illustrates an alternate structure for a fixed strap portion 114A, 114B that may be incorporated for example into the strap portion 14 of FIG. 1, between the releasable clasp member 16 and the bifurcated end portion of strap 14, for the purpose of adjusting the overall length of the strap. The embodiment of FIG. 2 may be seen to comprise a loop and buckle assembly 30 having a slidable clasp 32 attached to one end of the strap portion 114A and being slidably engaged in a known manner with the main portion of strap 114 so as to form a return loop 36 which permits the overall length of the return loop to be varied by adjusting the position of the clasp 32 along the body of the strap 114A. To anchor the clasp 32 in a desired position along the length of strap 114A, the strap may be provided with one or more belt apertures 40 for receiving a clasp tongue 42 of any known and suitable design. In the alternative, it will be understood that other forms of clasps may be used to fix the clasp in position along the length of strap 114 without use of apertures 40 and tongue 42. The second strap portion 114B corresponds to the bifurcated end of strap 14 of FIG. 1, having two parallel portions 118, 120 for receiving a mating movable strap portion [not shown in FIG. 2] therebetween. A pulley-type clasp 34 is attached to one end of strap 114B and is coupled in pulley fashion to the loop formed in strap 114A in well-known manner to provide means for adjusting the overall length of the combined strap 114A, 114B.

I claim:

1. A breakaway strap assembly for releasably restraining a movable object, comprising:

a first elongate flexible strap member having two oppositely facing elongate longitudinal surfaces thereon and having a releasable clasp at one end thereof; said first strap further having one part of a two-part flexible hook-and-loop fastener secured to at least a portion of the length of each of the said elongate longitudinal surfaces thereof;

a second elongate flexible strap having a releasable clasp coupled to one end thereof and having a bifurcated structure defining two substantially coextensive elongate strap elements that are coupled to each other at one end of each proximate to said releasable clasp and that extend therefrom to separate free ends, said strap elements being disposed in substantially parallel relationship having one face of each strap element disposed in opposed face-to-face relationship with one face of the other strap element;

each of the opposed faces of said second strap element having a second part of a two part flexible hook-and-loop fastener secured thereto for engagement with the said one part of said hook and loop fastener on said first strap; and so that said first strap is retained between the opposed surfaces of said second strap by releasable engagement of said first and second parts of said hook-and-loop fastener.

2. A breakaway strap assembly in accordance with claim 1, further comprising:

a restraining collar encircling said second strap in a plane transverse to the longitudinal direction thereof for maintaining the opposed faces of said second strap in close engagement with the oppositely facing elongate longitudinal surfaces of said first strap.

3. A breakaway strap assembly in accordance with claim 2, wherein said restraining collar is slidably displaceable along the length of said second strap such that the length of said first strap disposed between said collar and said releasable clasp on said second strap may be varied selectively by displacement of said collar.

4. A breakaway strap assembly in accordance with claim 1, wherein:

said second strap further comprises a loop and buckle assembly intermediate said releasable clasp and said one end of each of said elongate strap elements, for adjusting the overall length of said second strap.

5. A breakaway strap assembly in accordance with claim 1, wherein:

the said one part of said hook-and-loop fastener on said first strap is the loop part, to present a smoother surface texture when said first strap is manually gripped by an operator.

* * * * *